Oct. 14, 1941.                J. A. GIROUX                2,259,340
                          PROJECTION APPARATUS
                Filed June 6, 1939            7 Sheets-Sheet 1

INVENTOR
Joseph A. Giroux

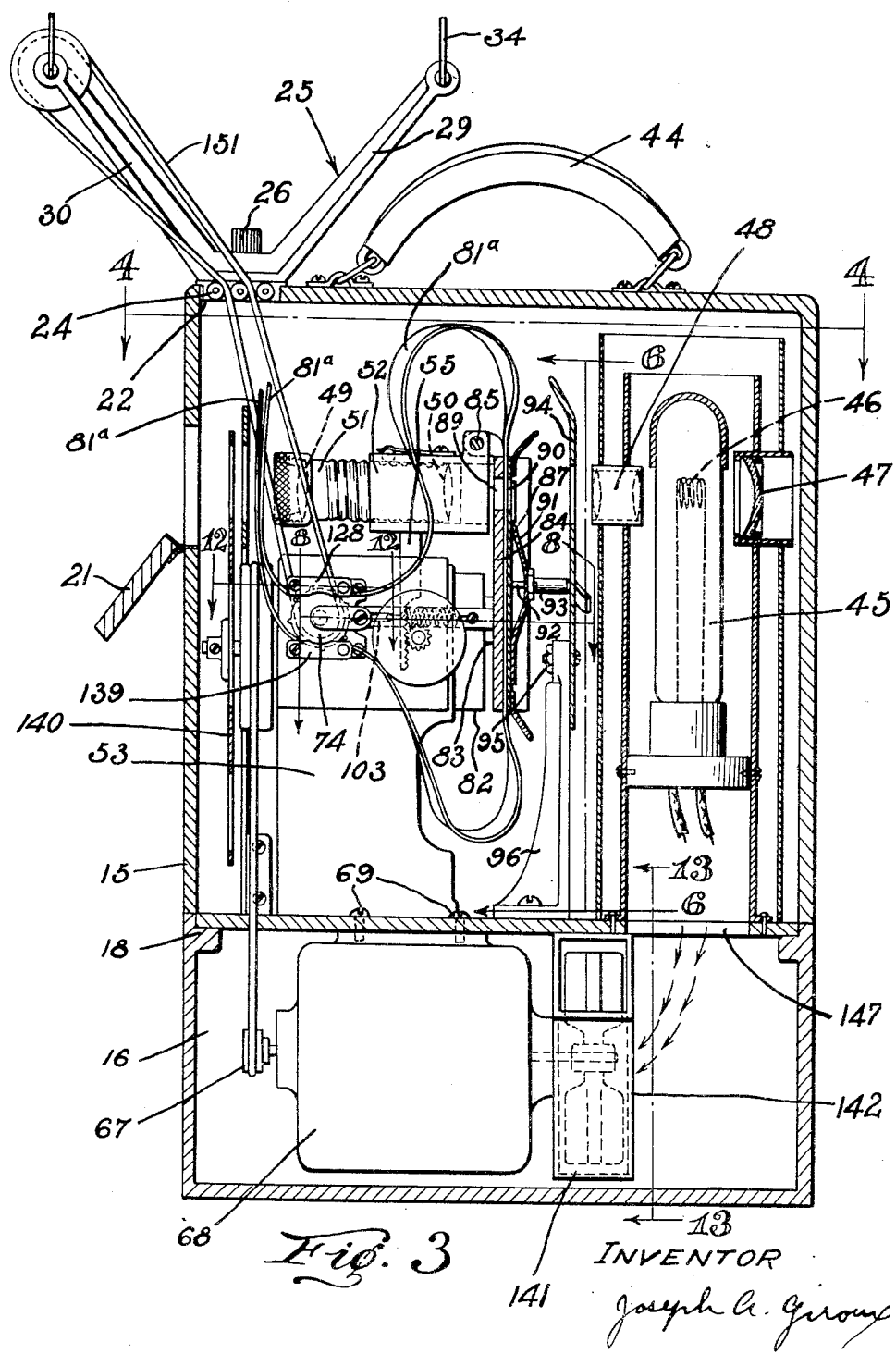

Oct. 14, 1941.    J. A. GIROUX    2,259,340
PROJECTION APPARATUS
Filed June 6, 1939    7 Sheets-Sheet 3
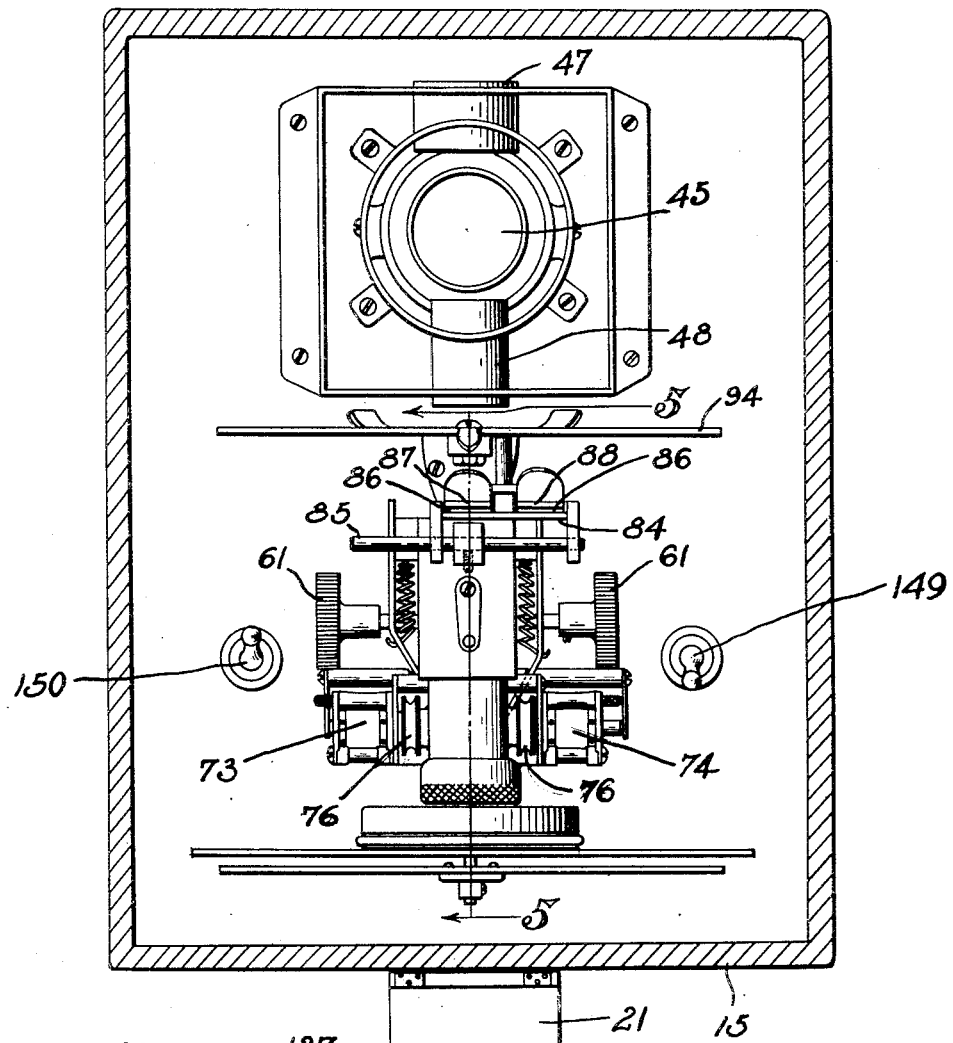
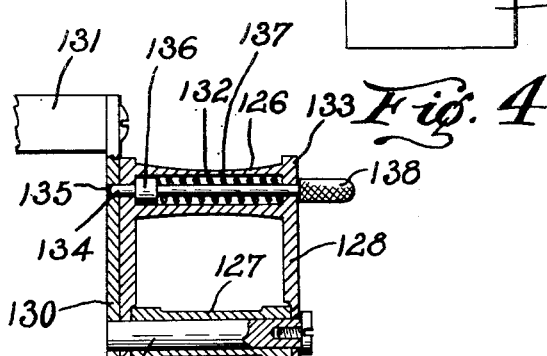
INVENTOR
Joseph A. Giroux INVENTOR
Joseph A. Giroux

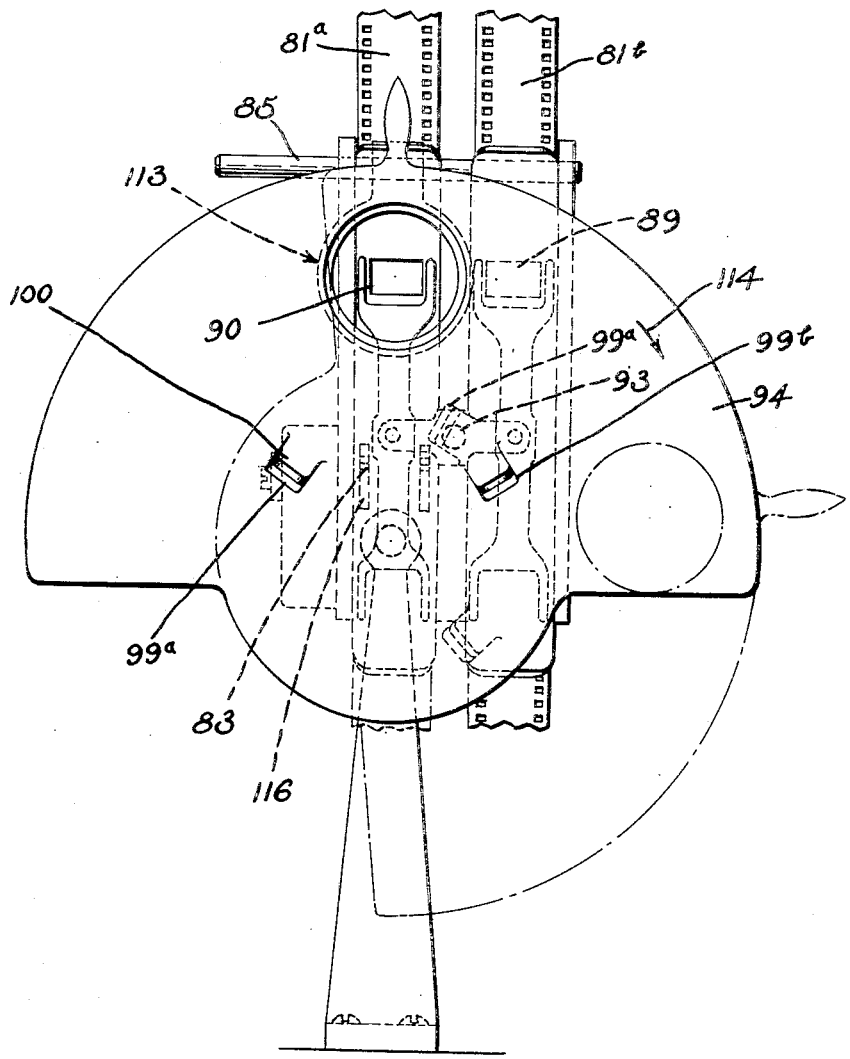

Oct. 14, 1941.  J. A. GIROUX  2,259,340
PROJECTION APPARATUS
Filed June 6, 1939  7 Sheets-Sheet 7

INVENTOR
Joseph A. Giroux

Patented Oct. 14, 1941

2,259,340

UNITED STATES PATENT OFFICE 2,259,340

PROJECTION APPARATUS

Joseph A. Giroux, Southbridge, Mass.

Application June 6, 1939, Serial No. 277,730

10 Claims. (Cl. 88—17)

This invention relates to a novel arrangement of projector for effecting relatively quick and easy shifting from one film to another in a single projector.

An object of the invention is to provide a projection device and more particularly a novel arrangement and method for relatively quick interchanging of films in a single projection apparatus in a simple and efficient manner and without said interchanging being appreciably noticeable to observers viewing the projected matter on a screen.

It has been usual in most instances in the past to provide separate projectors arranged for successive exposures of different films so that at the completion of the showing of one film by one projector the next successive film is shown by immediate operation of a second projector. The purpose of this arrangement was to provide ample time for interchanging of films without requiring a time lapse between the exposures. Such apparatus not only required the use of two projectors but also involved focusing difficulties in obtaining both of said projectors clearly focused on a single receiving screen.

The essence of the present invention is to obviate the initial expense involved with dual projectors through the provision of a single projector and two separate films supported in desired relation with said projector and associated mechanism whereby a rapid shifting from exposure of one film to the other may be quickly and easily effected at the completion of the showing of the previous film. The arrangement is such that while one film is being exposed the previously exposed film may be interchanged so that there will be no time lapse between the successive exposures of different films.

Another important feature of the invention is to provide baffle means correlated with the shifting mechanism whereby the projected beam may be shunted during said shifting of films, the said shifting taking place during the continued operation of the projector.

Figure 1:
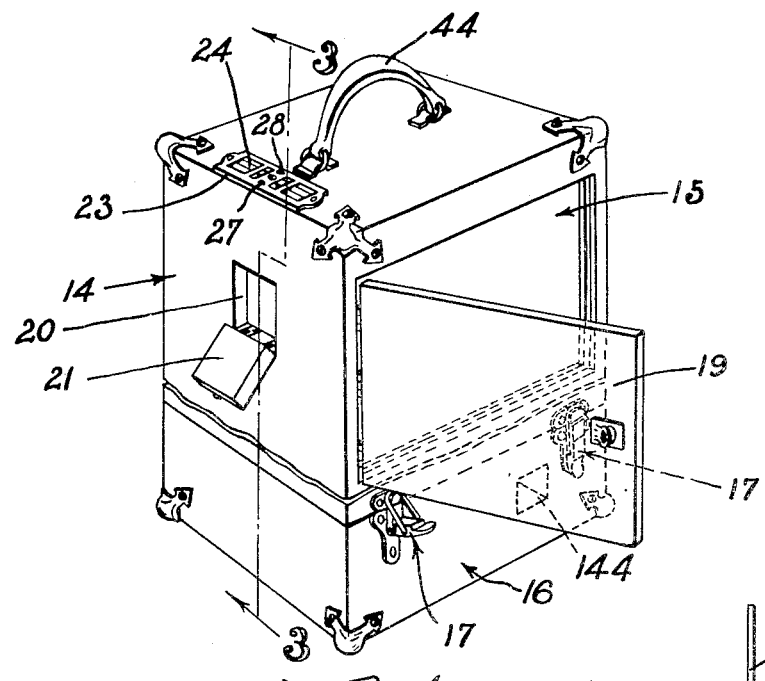
Figure 2:
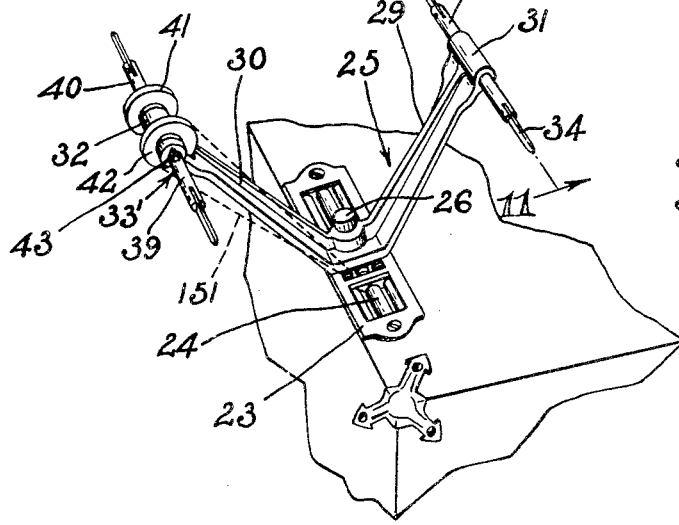
Figure 11:
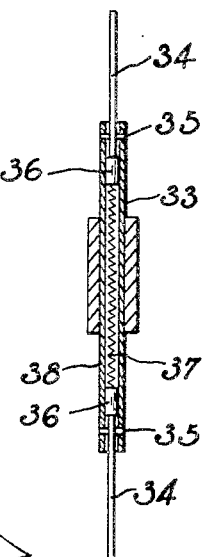
Figure 5:
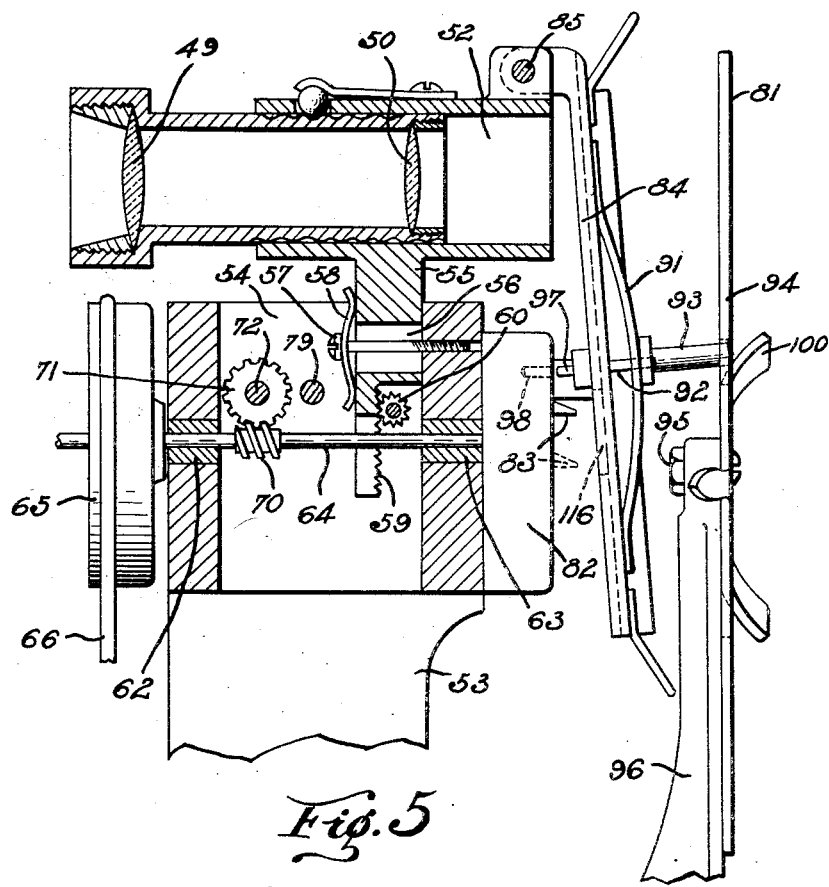
Figure 8:
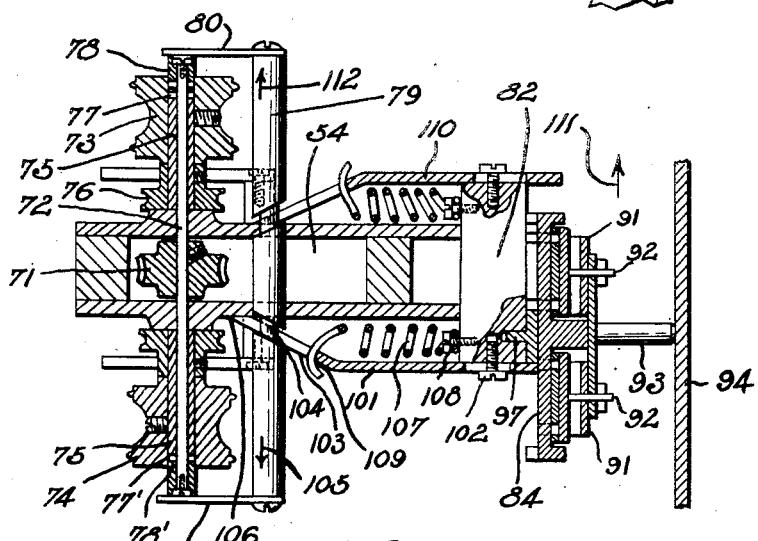
Figure 7:
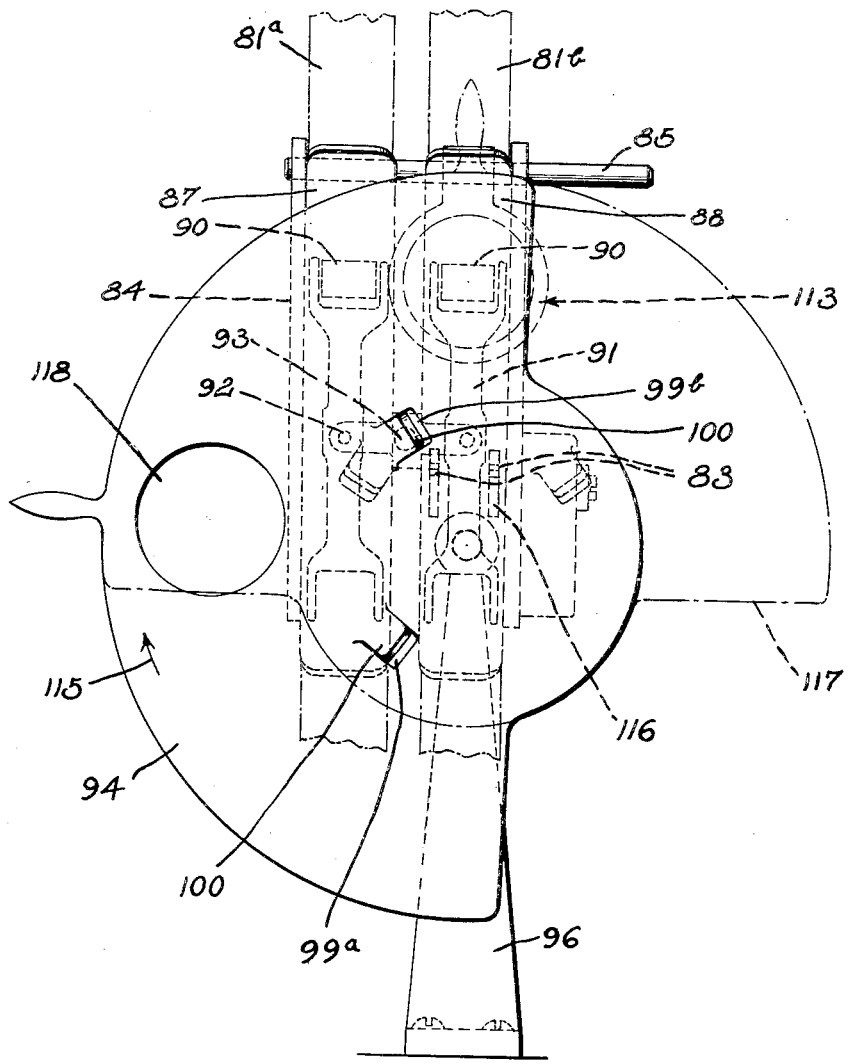
Figure 9:
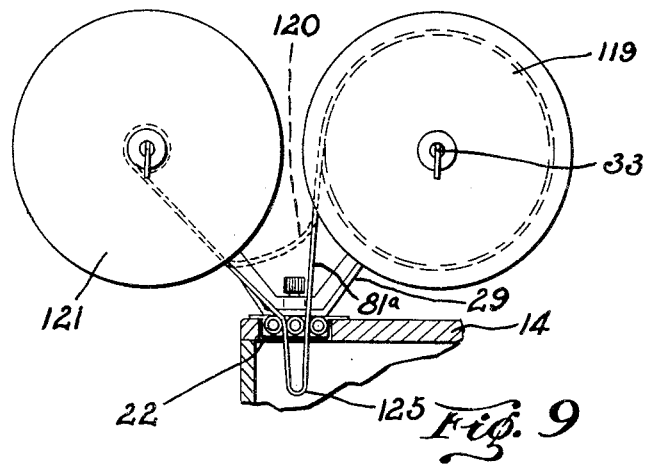
Figure 10:
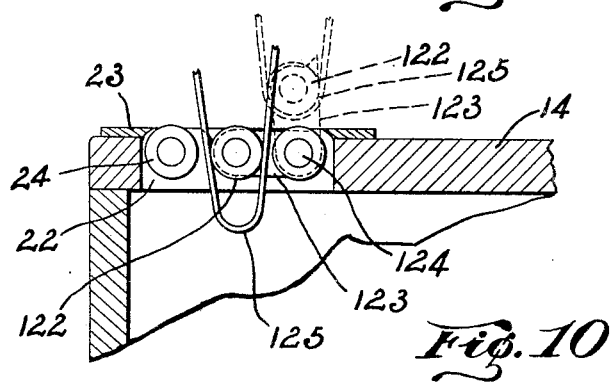
Figure 13:
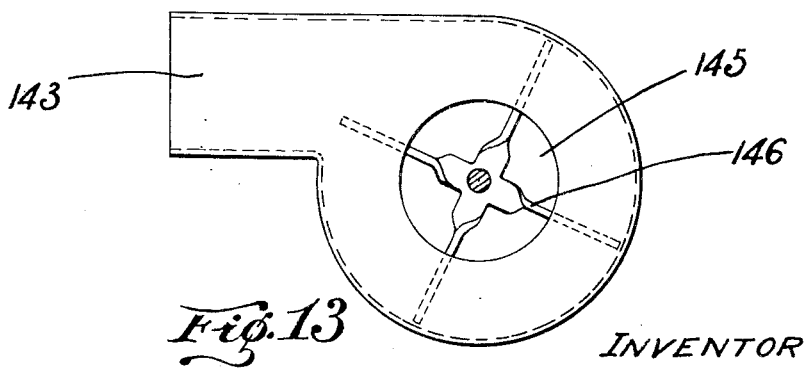

Referring to the drawings: Fig. 1 is a perspective view of the device embodying the invention; Fig. 2 is a fragmentary perspective view of the attachment for supporting the film spools; Fig. 3 is an enlarged sectional view taken as on line 3—3 of Fig. 1; Fig. 4 is a slightly enlarged sectional view taken as on line 4—4 of Fig. 3; Fig. 5 is an enlarged fragmentary sectional view taken as on line 5—5 of Fig. 4; Fig. 6 is an enlarged view taken as on line 6—6 of Fig. 3 and looking in the direction of the arrows; Fig. 7 is a view similar to Fig. 6 showing the parts in a different shifted position; Fig. 8 is an enlarged fragmentary sectional view taken as on line 8—8 of Fig. 3; Fig. 9 is a fragmentary side elevation of the film spool supporting means diagrammatically illustrating the initial threading of the film through the film guide rolls; Fig. 10 is an enlarged fragmentary view of the film guide rolls diagrammatically illustrating how the film is directed internally of the projector housing; Fig. 11 is an enlarged fragmentary sectional view of a film spool supporting spindle; Fig. 12 is an enlarged sectional view of an idler bracket for retaining the film in associated relation with the film feed sprocket; and Fig. 13 is a fragmentary side view of the cooling fan looking in the direction indicated along the line 13—13 of Fig. 13.

The projection apparatus embodying the invention is enclosed within a casing 14 having a compartment 15 in which the projector and associated mechanism is enclosed and is provided with a lower separable portion forming a compartment 16 in which the operating motor and cooling system for the projector is enclosed. The lower separable portion 16 of the casing is provided with a shouldered upper edge portion 18 in which is fitted the upper portion of the casing forming the compartment 15. By loosening the trunk latches 17 the said compartments may be readily separated. The upper portion of the casing 14 is provided with opposed door members 19 which provide means for gaining access to the interior of the compartment 15. The front wall of the casing is provided with a relatively small opening 20 through which the projected beam is emitted from the compartment 15. A suitable door 21 is adapted to close the said opening 20 when the projector is not in use.

The upper portion of the casing is provided with an opening 22 over which is mounted a plate 23 having a plurality of guide rolls 24 rotatably supported thereon. The plate member 23 also provides means for attaching a bracket 25 for supporting the film spools. The bracket 25 is detachably connected with the plate 23 by a clamp screw 26. Suitable locating pins, not shown, are adapted to interfit with spaced openings 27 and 28 in said plate 23, see Fig. 1. The bracket 25 comprises a pair of angularly disposed arms 29 and 30. Each of the respective arms is provided with a bearing 31 and 32 in which is mounted a suitable spindle 33 for supporting the film spools. The spindle 33, as illustrated in Fig. 9, is provided with fingers 34 hinged thereto as illustrated at 35. These fingers are held in adjusted position by plungers 36 constantly urged toward said fingers by a coil spring 37 supported internally of a hollow bore 38 in said spindle. The spindle supported by the arm 29 is preferably held stationary, while the spindle 33' carried by the opposed arm 30 is rotatably supported in the bearing 32. The spindle 33' carried by the arm is formed in two separate sections 39 and 40, each having a pulley 41 and 42 rigidly mounted thereon. Each of the separate sections 39 and 40 is provided with a key 43 adapted to interlock with the film take up spools which are mounted on said sections 39 and 40, so that when the said sections 39 and 40 are rotated through rotation of the pulley 41 and 42, the said film take up spools will be simultaneously rotated. The entire bracket 25 may be quickly detached from the casing 14 by merely removing the lock bolt 26. For ease in carrying the casing 14 is provided with a suitable handle 44.

The projector system is of the usual conventional type embodying a lamp 45 having a filament 46 aligned with a suitable reflector 47 for directing the light rays into a condenser system 48. Suitable projection lenses 49 and 50 are provided for focusing the film on a suitable receiving screen. The projection lens system is mounted in a tube 51 adjustably supported in a bearing 52. The bearing 52 is in turn adjustably supported on a base 53. The said base, as shown in Fig. 5, has a channeled upper portion 54 in which an integral stem 55 on the bearing 52 extends. The said stem 55 is provided with a slotted portion 56 through which an attaching screw 57 extends. The stem 55 is slidably supported in the channel 54 by a blade spring 58. The lower end of the stem 55 is provided with a rack portion 59 in constant mesh with a pinion gear 60. The said pinion gear is rotated by suitable thumb wheels 61. Rotation of the pinion 60 through the thumb wheels 61 imparts an upward and downward movement to the projection lens system which comprises the lenses 49 and 50. This up and down adjustment is for the purpose of suitably framing the exposures of the film which will be described hereinafter in detail.

The upper channeled portion 54 is provided with spaced bearings 62 and 63 in which is rotatably supported a shaft 64. The shaft 64 is rotated by means of a pulley 65 operably connected through a suitable belt 66 to a drive pulley 67 carried by a motor 68. The motor 68 is secured internally of the lower compartment 16 by suitable connection screws 69. The shaft 64 has a drive worm 70 mounted thereon. The worm 70 is in constant mesh with the worm gear 71 mounted on a shaft 72 also rotatably supported in the upper channeled portion 54. The shaft 72 is slidably mounted in the upper portion 54 so that it may be moved in a direction longitudinally thereof. The said shaft 72 extends outwardly of the opposed sides of the channeled portion 54 and is adapted to support a pair of drive sprockets 73 and 74. The said sprockets 73 and 74 are each mounted on sleeves 75 and 75' which are in turn loosely mounted on the shaft 72. Each of said sleeves 75 has a drive pulley 76 secured thereto adjacent the sprockets 73 and 74.

The sleeves 75 and 75' are each provided with a toothed end 77 and 77' adapted to be moved into and out of engagement with a similarly toothed collar 78 and 78' located adjacent the respective ends of the shaft 72. The said collars 78 and 78' are rigidly secured to the shaft 72 so that when the toothed ends 77 and 77' are engaged with the toothed edge of said collars, a driving action will be imparted to the respective sprocket 73 or 74 carried thereby. The clutch members formed by the respective toothed edges 77 and 78 or 77' and 78' are moved into and out of engagement with each other by the longitudinal movement of the drive shaft 72. This engaging and disengaging of the clutch members is brought about by a slide rod 79 also mounted in the upper channeled portion 54, see Figs. 5 and 8. The slide rod 79 is provided adjacent the opposed ends thereof with blade springs 80 engaging the respective ends of the shaft 72 so that when the slide rod is moved in its bearing connection with the channeled portion 54 in a direction longitudinally thereof, a similar movement will be imparted to the drive shaft 72 so that the clutch members for the respective sprockets 73 and 74 are engaged and disengaged, that is, when the clutch portions for one of said sprockets are interconnected for driving action, the clutch portion for the other respective sprocket will be simultaneously disengaged so that a rotary movement is imparted to only one of said sprockets at a time. These sprockets 73 and 74 are adapted to receive separate film members 81a and 81b which are directed through the opening 22 in the top of the casing 14. The connection of the films with said sprockets will be described in detail hereinafter.

The shaft 64 is connected with intermittent film advancing mechanism 82. This film advancing mechanism is of the usual commercial type having fingers 83 which move outwardly of the immediate housing of said mechanism into engagement of the film and then move downwardly a given amount, at which point the said fingers move inwardly of the housing of said mechanism and are then raised for the next successive movement. The driving action for this film advancing mechanism is imparted through the shaft 64 so that simultaneous to the rotation of the respective sprockets 73 and 74 the film advancing mechanism also operates. The film 81a or 81b is held in engagement with the film advancing mechanism 82, that is, in alignment with the reciprocating fingers 83, by a plate 84. The plate 84 is pivotally and slidably attached to a pin 85 carried by the bearing 52 so that it will be free to swing toward and away from the fingers 83 and to be moved in a sidewise direction relative to said fingers. The said plate 84, as shown in Figs. 3, 4, 6 and 7, is provided with spaced longitudinal channels 86 in which the respective films 81 are slidably mounted. The films 81a and 81b are retained in the channels 86 by floating guide plates 87 and 88.

The respective channel portions of the plate 84 are provided with a window opening 89 with which the matter on the films is adapted to be framed during the intermittent advancing of said film. These framing openings 89 are separately aligned with the projected beam of light. Similar window openings 90 are formed in the guide plates 87 and 88. The guide plates 87 and 88 are yieldingly held in position by blade springs or the like 91. These blade springs are supported in position by guide pins 92 carried by the plate 84. The plate 84 is provided with a pin 93 which is rigidly supported thereon. This pin 93 is adapted to engage a baffle plate 94 which is pivotally connected at 95 to a supporting bracket 96. The plate 84 is provided with a locating stud 97 adapted to alternately and separately engage spaced recesses 98 in the housing which supports the film advancing mechanism 82. One of said recesses is shown engaging the pin 97 in the cut away end of the housing for the film advancing mechanism 82 (Fig. 8), the other recess being in the other end of the housing and not shown.

The stud 97 and recess 98 are so positioned that when the plate 84 is swung rearwardly on the pivot 85 and is moved sidewise so as to locate the film to be projected in alignment with the beam of light, the said aligned recess 98 and pin 97 will move into engagement with each other and hold the said plate and associated films in desired position. This movement of the pin 97 internally of the recess is brought about by operation of the baffle plate 94. This movement is brought about through the provision of spaced openings 99a and 99b in said baffle plate 94 and cam members 100 adjacent each of said openings. The function of these openings and cam members will be described more in detail hereinafter.

When the pin 93 engages the adjacent surface of the baffle plate 94, the plate 84 will be swung on its pivotal connection 85 toward the film advancing mechanism 82 and will simultaneously cause the aligned pin 97 and recess 98 to move into interlocked relation with each other and move the film carried by the plate 84 into engagement with the fingers 83 of the film advancing mechanism 82. This movement of the plate 84 toward the film advancing mechanism 82, as shown in Fig. 8, causes said plate to engage a slide member 101. The member 101 is slidably mounted at one end on a screw 102 carried by the housing 82 and which extends through a slot in said slide member and at its opposite end, on the slide rod 79 through the provision of a bifurcated end 103 which straddles the rod 79 and fits within opposed slots 104 in said rod. The bifurcated end of the slide 101 is illustrated at 103 in Fig. 3. The bifurcated end 103 is angularly disposed relative to said slide member and functions as cam means engaging the side walls of the opposed slots 104 in the slide rod 79. The movement of the slide member toward the slide rod 79 causes the angularly deflected bifurcated end portion to engage the side walls of the opposed slots 104 and move the slide rod in the direction indicated by the arrow 105. This movement causes the clutch means 77 and 78 for the sprocket 73 to be engaged so that the shaft 72 will impart a driving movement to said sprocket. The ends 106 of the bifurcated portion engage the adjacent side wall of the channeled portion 54 during the longitudinal movement thereof toward and away from the slide rod 79. A suitable coil spring 107, secured at 108 adjacent one end thereof to the housing of the film advancing mechanism 82 and at its opposed end 109 to the slide member 101 normally urges said slide member toward the plate 84 and is adapted to swing the plate 84 away from the film advancing mechanism 82 when the pin 93 is aligned with one of the openings 99a or 99b. When in this position the said spring 107 will move the slide 101 in a direction away from the slide rod 79 and allow the clutch members 77 and 78 for the sprocket 73 to move out of driving connection with each other. A similar slide plate and associated mechanism is illustrated at 110 on the opposite side of the channeled support 54. The said slide member 110 and associated mechanism is identical to the slide member 101 and the associated mechanism therefor.

When the plate 84 is in engagement with the slide member 101 as illustrated in Fig. 8, the said slide member 110 and associated mechanism is out of engagement with said plate so that the member 110 has no effect upon the movement of the slide rod 79 as brought about by engagement of the plate 84 with the slide member 101 as set forth above. When the clutch members 77 and 78 of the sprocket 73 are engaged with each other through the cam action of the angled portion 103 on the slide rod 79 as set forth above the similar clutch members 77' and 78' for the sprocket 74 are disengaged so that rotary movement is imparted only to the sprocket 73. When the plate 84 is swung rearwardly and is moved in the direction indicated by the arrow 111, the said plate will move out of engagement with the slide member 101 into engagement with the slide member 110. Pressure on the slide 110 by the plate 84, simulating the pressure of said plate on the slide 101 will move the rod 79 in a direction indicated by the arrow 112. Movement of the slide rod 79 in the direction indicated by the arrow 112 engages the clutch members 77' and 78' of the sprocket 74 and simultaneously disengages the clutch members 77 and 78 for the sprocket 73. This, therefore, transfers the rotary movement from the sprocket 73 to the sprocket 74 and simultaneously moves the film associated with said respective sprocket 74 into alignment with the projected beam of light and simultaneously moves said film into engagement with the film advancing mechanism 82.

The shifting of the driving action from one film drive sprocket to another and the simultaneous movement of the respective films associated with said sprockets and with the plate 84 into and out of alignment with the projected beam of light has been described above. This movement is brought about as follows:

Referring to Figs. 6 and 7 it will be noted that in Fig. 6 the film 81a is in line with the projection system of the instrument as illustrated at 113. To move the film 81b into alignment with said projection system, the baffle plate 94 is first moved in the direction indicated by the arrow 114 an amount sufficient to cause the pin 93 to engage with the recess 99a. The coil spring 107 normally urging the slide member 101 or 110, as the case may be, toward the plate 84, will cause said plate 84 to swing outwardly, see Fig. 5, and in turn cause the pin 93 to move inwardly of the opening 99a. This is diagrammatically illustrated by the dash lines in Fig. 6, when in this position the plate 84 and films carried thereby are clear of the film advancing fingers 83 as shown in Fig. 5. Movement of the plate 94 in a direction opposite that indicated by the arrow 114 will cause the pin 93, engaged in the opening 99a, to move the plate 84 sidewise in a direction longitudinally of the slide pin 85 carried by the bearing 52 to a position such as illustrated in Fig. 7 whereby the film 81b will be moved into alignment with the projection system 113.

It will be noted that during this movement the solid wall of the baffle plate covers the projection system 113 so that the projected beam of light is shunted and nothing will be visible on the screen on which the film images are projected. After having moved the film 81b into alignment with the projection system 113 further movement of the baffle plate 94 in said direction causes the cam 100 adjacent the opening 99a to engage the end of the pin 93 and cam it outwardly of the opening 99a into engagement with the solid wall of the plate 94, which action, urges the said pin and plate 84 toward the film advancing mechanism 82. This causes the fingers 83 to extend through the slots 116 in the plate 84 and engage with the film 81b carried by said plate.

It is to be noted that there are two spaced fingers 83, and that each of the channeled portions of the plate 84 is provided with spaced slots 116 through which the fingers extend to engage with the perforated sides of the films 81a and 81b.

The baffle plate 94, as illustrated in Fig. 7, is moved to the position indicated by the dot and dash lines 117, whereupon an opening 118 in said baffle plate will be aligned with the projection system 113.

It will be noted that when the film 81b is in line with the projection system 113, the film 81a, as shown in Fig. 7, which was previously aligned with said projection system, is moved out of alignment with said projection system and may then be replaced with a new film 81a. This new film 81a may be moved into alignment with the projection system 113 through manipulation of the baffle plate 94 in a manner similar to that described above in connection with the moving of the film 81b into alignment with said projection system. In this instance, however, the opening 99b is moved into engagement with the pin 93 by rotating the baffle plate 94 in the direction opposite that indicated by the arrow 115 and to the position indicated in full lines. Subsequent rotation of the baffle plate 94 in the direction indicated by arrow 115 shifts the film supporting mechanism sidewise in said direction and simultaneously moves the new film 81a into alignment with the projection system 113 whereupon continued movement imparted to the baffle plate 94 in said direction causes the cam 100 adjacent the opening 99b to move the plate 84 toward the film advancing mechanism 82 and move the opening 118 into alignment with said projection system. This alternate shifting of the plate 84 sidewise and toward and away from the film advancing mechanism 82 simultaneously shifts the driving connection from the sprocket 73 to the sprocket 74 and vice versa as previously described above so that first one sprocket and then the other is rotated. It is to be noted that the driving action is in an alternate function and is such as to impart a driving action only to the immediate sprocket carrying the film which is in alignment with the projection system 113.

The respective films 81a and 81b are carried by film spools 119 mounted on the spindle 33 carried by the arm 29, see Figs. 2 and 9. For ease of description only one of the films is referred to. This film is designated as 81a. A sufficient amount of film is first drawn from the film spool 119 and is directly threaded as illustrated by the dash lines 120 on the film take up spool 121. A loop 125 between the film spool 119 and the film take up spool 121 is then drawn downwardly and fitted over a roller 122 rotatably carried by a swivel support 123. The said support is pivoted at 124 to the plate 23 mounted over the opening 22 in the top of the casing. The loop 125 of the film is then drawn downwardly internally of the casing by drawing the film 81a from the film spool 119. A sufficient amount of film 81a, as shown in Fig. 3, is drawn from the film spool 119 to permit the said film to be placed over the film sprocket 74. The film is then looped upwardly and is placed between the plate 84 and spring pressed shield 87. The portion of the film which extends downwardly below the plate 84 and shield 87 is then directed upwardly and is threaded to the lower portion of the sprocket 74 and thence travels upwardly to the film take up spool 131.

The film 81a is held in engagement with the film sprocket 74 by means of guide members 126 and 127 carried by a bracket 128, see Fig. 12. The bracket 128 is pivoted concentrically of the guide member 127 to a pin member 129 supported by a plate 130. The said plate is connected by studs 131 to the side walls of the channeled support 54, see Figs. 4, 8 and 12. The guide member 126 is provided with a hollow bore 132 in which a plunger 133 is slidably mounted. The plunger 133 has an end 134 which is adapted to engage in an opening 135 in the plate 130. The plunger 133 is provided with an enlargement 136 with which a coil spring 137 engages at one end thereof. The said coil spring surrounds the plunger 133 and engages the bracket adjacent its end opposite the end which engages the enlargement 136. The plunger 133 is provided with an external knurled fingerpiece 138 by which the said end 134 may be disengaged from the opening 135 so that the bracket 128 may be swung upwardly away from the sprocket 74. The film may be placed on said sprocket and held thereon by moving the bracket downwardly to engage the plunger end 134 with the opening 135. This moves the guide members 126 and 127 into engagement with the film on the sprocket. A similar bracket 139 is provided below the sprocket 74, see Fig. 3. It is to be understood that each of the sprockets 73 and 74 are provided with similar guide members and brackets.

By referring to Fig. 10 it will be noted that the roller 122 is swung downwardly to a position illustrated in full lines after the film has been threaded as set forth above. Each of the films are similarly threaded with the sprockets and associated supporting mechanism and may be quickly and easily interchanged. A similar arrangement is used for both films.

It is to be noted that the sprockets 73 and 74 are alternately rotated through the shifting of the clutches 77—78 and 77'—78' into and out of engagement with each other as set forth above and that the film in immediate alignment with the projection system is intermittently advanced by the film advancing mechanism 82. The sprocket 74 and film advancing mechanism are simultaneously driven through rotation of the shaft 64 which in turn is rotated by the pulley 65. The pulley 65 is driven by the motor 68 through the belt connection 66.

A flicker shutter 140 is mounted on the shaft 64 and is continually rotated during the operation of the projector. As shown in Figs. 3 and 13, a ventilation blower 141 is provided in the lower compartment 16 of the casing. This blower comprises a housing 142 having a discharge nozzle 143 aligned with an opening 144 in the side wall of the lower compartment. The housing is provided with an inlet opening 145 in its side wall and is provided internally thereof with a fan 146 mounted on the rotor shaft of the motor 68. The partition between the lower compartment 16 and the upper compartment 15 is provided with an opening 147 communicating with the lamp housing of the projector. Hot air in the lamp housing is drawn downwardly through the opening 147 internally of the housing 142 through a sucking action created by the revolving fan 146 and is forced by said fan outwardly of the opening 144 in the side wall of the lower compartment 16. This produces a circulating cooling system for the projector.

The respective films 81a and 81b are moved into proper alignment with the framing openings 89 by moving the projection system upwardly or downwardly through rotation of the hand wheels 61. This causes the gear 60 which engages the rack 59 to move the support 55 upwardly or downwardly and simultaneously moves the projection system carried by said support in said directions.

It is to be understood that the lamp 45 and motor 68 are connected to a suitable circuit adapter, not shown, so that the said projector may be connected with any desirable line current in a conventional manner. Suitable switches 149 and 150 may be connected in the motor and lamp circuits so that one or the other may be turned on or off simultaneously or independently of each other.

The film take up rolls 121 are mounted on the spindles 39 and 40 carried by the arm 38 and are engaged with the key members 43 so as to be rotated with said spindles during the operation of the projector. The spindles 39 and 40 are rotated independently of each other through the pulleys 41 and 42 respectively driven by spring type belt members 151. The belt members 151 are in turn connected with the pulleys 76 mounted on the sleeves 75 adjacent the respective sprockets 73 and 74. It is to be noted that when the clutch members 77 and 78 or 77' and 78', are engaged the respective sleeve 75 is rotated and the respective pulley 76 on said sleeve is rotated. This causes the proper film take up roll to be rotated simultaneous to the intermittent advancing of the film.

When the projector is not in use the bracket 25 is removed by backing out the connection screw 26. The respective belts 151 are removed from the pulleys 41 and 42 and are drawn inwardly of the guide rolls 24. The respective doors 19 are closed and the door 21 of the projection window 20 is closed. The bracket 25 and films may be placed internally of the compartment 15 so that the projector may be easily carried by the handle 44.

The projector is of a simple portable type whereby different films may be independently exposed in a quick and easy manner and may be quickly and easily interchanged without disturbing the operation of the projector.

Having described my invention, I claim:

1. In a device of the character described the combination of a source of illumination and a projection system aligned with said source of illumination, means for supporting two separate films, a pair of drive sprockets to which each of said separate films are to be respectively threadedly connected, common drive means, a film guide plate pivotally and slidably supported by said projection system, said film guide plate having spaced guideways, one for each of the respective films, and having spaced projection openings therein, and means operable by said guide plate for selectively interconnecting the drive sprocket for the film to be exposed with the common drive means to impart a rotary movement to said drive sprocket.

2. In a device of the character described the combination of a source of illumination and a projection system aligned with said source of illumination, means for supporting two separate films, a pair of drive sprockets to which each of said separate films are to be respectively threadedly connected, common drive means, a film guide plate pivotally and slidably supported by said projection system, said film guide plate having spaced guideways, one for each of the respective films, and having spaced projection openings therein, means operable by said guide plate for selectively interconnecting the drive sprocket for the film to be exposed with the common drive means to impart a rotary movement to said drive sprocket, and means for selectively slidably shifting said guide plate and for moving said guide plate on its pivotal connection.

3. In a device of the character described the combination of a source of illumination and a projection system aligned with said source of illumination, means for supporting two separate films, a pair of drive sprockets to which each of said separate films are to be respectively threadedly connected, common drive means, a film guide plate pivotally and slidably supported by said projection system, said film guide plate having spaced guideways, one for each of the respective films, and having spaced projection openings therein, means operable by said guide plate for selectively interconnecting the drive sprocket for the film to be exposed with the common drive means to impart a rotary movement to said drive sprocket, manually operable means supported for pivotal movement in opposite directions and means on said guide plate engageable with said manually operable means for causing said guide plate to be slidably adjusted in the direction of movement of said manually operable means and to be rocked about its pivotal connection with the projection system.

4. In a device of the character described the combination of a source of illumination and a projection system aligned with said source of illumination, means for supporting a plurality of separate films, drive sprockets for each of said separate films to which said films are respectively threadedly connected, common drive means for selective interconnection with said drive sprockets, common drive means for separately intermittently advancing a selected film, a guide plate slidably and pivotally supported adjacent the drive means for intermittently advancing said films, said guide plate having spaced guideways for each of said films and having a projection opening for each of said films and means for operating said guide plate about its slidable and pivotal connection for selectively engaging the films carried thereby with said common drive means for said films and for selectively engaging the drive sprocket of said film engaged with said film drive means with the common drive means for driving said sprockets.

5. In a device of the character described the combination of a source of illumination and a projection system aligned with said source of illumination, means for supporting a plurality of separate films, a drive sprocket for each of said films and to which said films are respectively threadedly connected, common drive means for selective interconnection with said drive sprockets, common drive means for intermittently advancing the films, a guide plate having a plurality of guideways in which said respective films are supported, said guide plate being pivotally and slidably supported for movement relative to said common drive means for intermittently advancing the films and manually operable means for operating said guide plate for selectively engaging the films with said common drive means for intermittently advancing said films and for simultaneously interconnecting the respective drive sprockets for said films with said common drive means for said sprockets and said guide plate having a plurality of projection openings therein aligned with each of the respective films and each of said openings being selectively alignable with the projection system during the manual adjustment of said guide plate.

6. In a device of the character described the combination of a source of illumination and a projection system aligned with said source of illumination, means for supporting a plurality of separate films, a drive sprocket for each of said films, common drive means selectively engageable with said drive sprockets for selective rotation thereof, cam means associated with said drive sprockets and common drive means for bringing about selective engagement of said sprockets with said drive means and a guide plate having a plurality of guideways therein for the respective films, said guide plate being pivotally supported for swinging movement and being adapted to selectively engage the cam means for selectively interconnecting one of the drive sprockets with the common drive means.

7. In a device of the character described the combination of a source of illumination and a projection system aligned with said source of illumination, means for supporting a plurality of separate films, a drive sprocket for each of said films, common drive means arranged for selective interconnection with said drive sprockets, a plurality of cam members having cam operating means associated therewith separately operable for selectively engaging a drive sprocket with said common drive means, a guide plate having a plurality of guideways and projection openings therein to which said films are slidably connected and having a projection member on one side thereof, common means, independently of said common drive means, for intermittently advancing said films and means engageable with the projection member for adjusting said guide plate having the plurality of guideways therein for supporting said films for selectively aligning said films in a substantially straight line sidewise direction with the projection system and for simultaneously engaging said aligned film with said common means for intermittently advancing said film and for simultaneously engaging said guide plate with the cam operating means for operating a cam member to cause the drive sprocket of said film to engage with said common drive means for said drive sprockets.

8. In a device of the character described for supporting a plurality of films the combination of a source of illumination and a projection system aligned with said source of illumination, single plate-like means slidably and pivotally supported and having a plurality of guideways therein in which said respective films are slidably supported, said plate-like means having a plurality of projection openings therein aligned with the respective films and manually operable means selectively engageable with said plate-like means for slidably and pivotally adjusting said plate-like means an amount sufficient to selectively align the films carried by said plate-like means with said projection system.

9. In a device of the character described for supporting a plurality of films the combination of a source of illumination, a projection system aligned with said source of illumination, single plate-like means having a plurality of guideways therein for respectively receiving said films, said plate having a plurality of projection openings therein aligned with the respective guideways for said films, common drive means selectively engageable with the respective films for intermittently advancing said films and means for adjusting said plate-like means in a substantially straight line sidewise direction for selectively aligning the films with the projection system and for simultaneously engaging said aligned films with said common drive means.

10. In a device of the character described the combination of a source of illumination and a projection system aligned with said source of illumination, means for supporting a plurality of films, a rotatable drive sprocket connected with each of said films, common drive means selectively engageable with said drive sprockets, operable means for selectively bringing about said engagement with said drive sprockets, a plurality of cam members selectively engageable with said operable means, a guide plate pivotally supported for movement toward and away from said cam means and slidably supported for movement in a direction transversely of said cam means, said guide plate having a plurality of guideways therein in which each of said films are supported, each of said guideways having a projection opening therein, common means for intermittently advancing a film aligned with the projection system and manually operable means engageable with said guide plate for imparting sliding lateral movement thereto for selective alignment of the films with said projection system, said manually operable means embodying cam means for imparting movement of said guide plate about its pivotal connection to engage the film aligned with the projection system with the common drive means for intermittently advancing said film and for simultaneously operating the cam means associated with the operable means for the drive sprockets for selectively engaging the drive sprocket of said aligned film with said common drive means for said drive sprockets.

JOSEPH A. GIROUX.